Feb. 5, 1946.   L. G. HILL   2,394,175
ATTACHMENT FOR LATHES AND THE LIKE
Filed Sept. 28, 1942   2 Sheets-Sheet 1
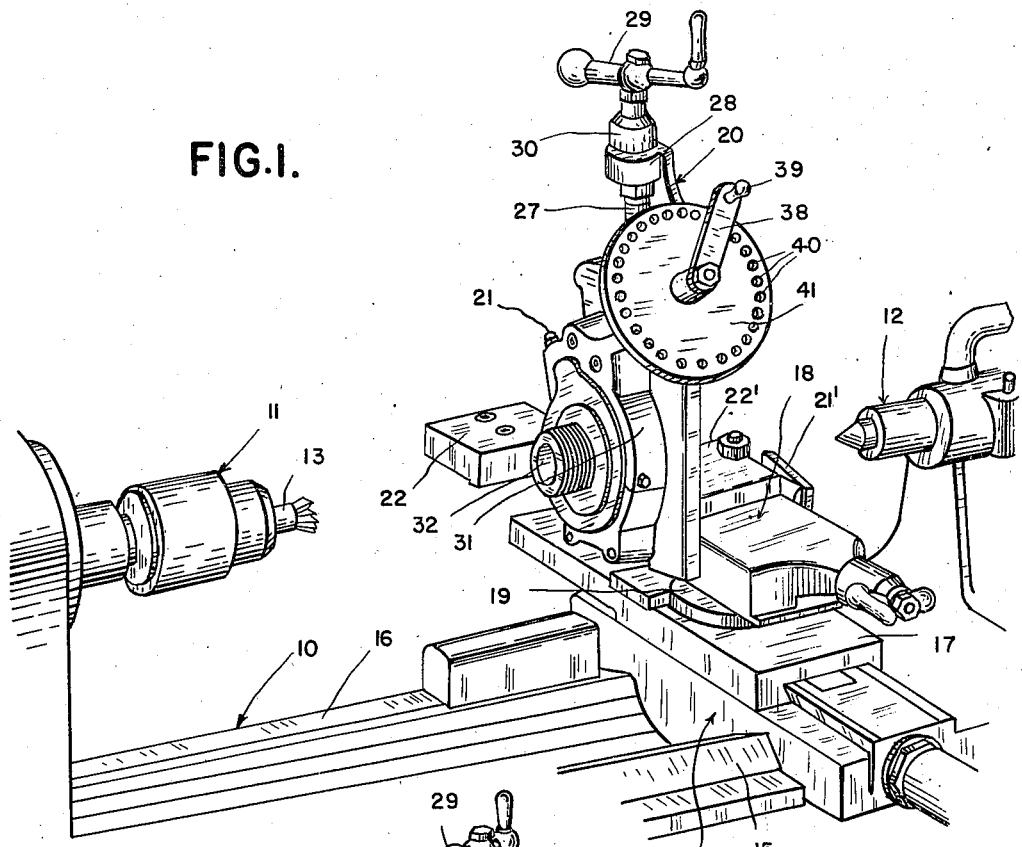
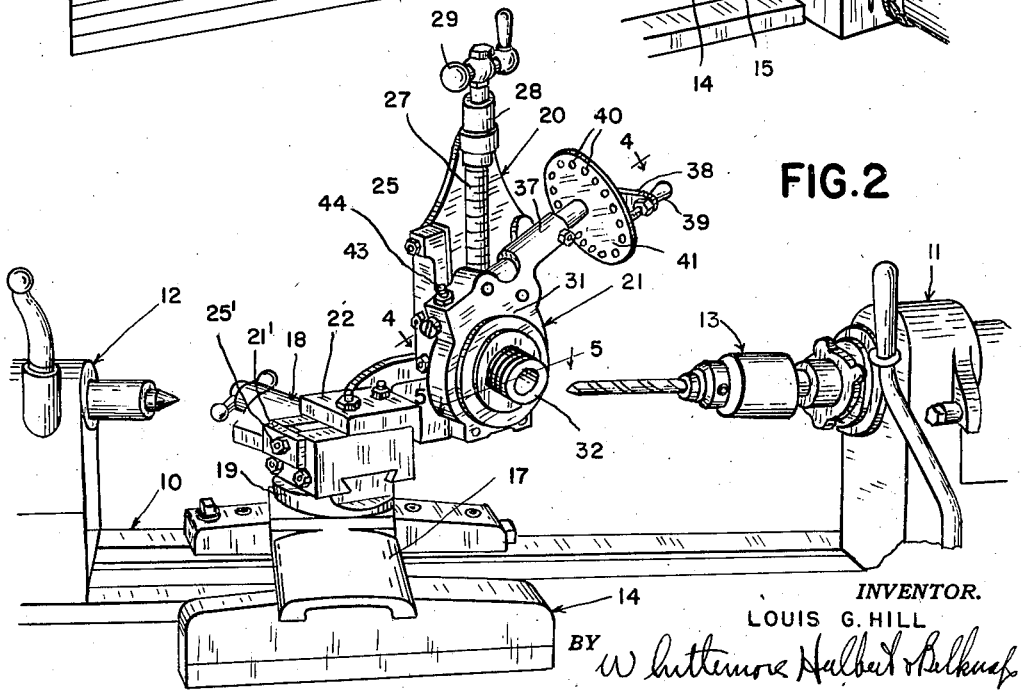
INVENTOR.
LOUIS G. HILL
ATTORNEYS Feb. 5, 1946.   L. G. HILL   2,394,175
ATTACHMENT FOR LATHES AND THE LIKE
Filed Sept. 28, 1942   2 Sheets-Sheet 2

INVENTOR.
LOUIS G. HILL
BY Whittemore Hulbert & Belknap
ATTORNEYS

Patented Feb. 5, 1946

2,394,175

UNITED STATES PATENT OFFICE 2,394,175

ATTACHMENT FOR LATHES AND THE LIKE

Louis G. Hill, Detroit, Mich.

Application September 28, 1942, Serial No. 459,960

2 Claims. (Cl. 29—27)

This invention relates generally to machine tools and refers more particularly to an improved attachment for lathes.

One of the principal objects of this invention is to provide an auxiliary tool or attachment capable of being readily mounted on an orthodox metal turning lathe to enable performing operations on the lathe which, under ordinary circumstances, would require other types of machines such, for example, as milling machines.

Another object of this invention is to incorporate a dividing head in the auxiliary attachment and thereby further increase the number of operations capable of being performed on the lathe.

Still another object of this invention is to provide a combined milling and dividing head attachment capable of being readily mounted on the compound of a metal turning lathe in a manner which enables the use of the various compound feeds to operate the attachment.

The foregoing, as well as other objects, will be made more apparent as this description proceeds, especially when considered in connection with the accompanying drawings, wherein:

Figure 1 is a fragmentary perspective view of a lathe having an attachment constructed in accordance with this invention;

Figure 2 is a view similar to Figure 1 showing the parts in a different position;

Figure 3:
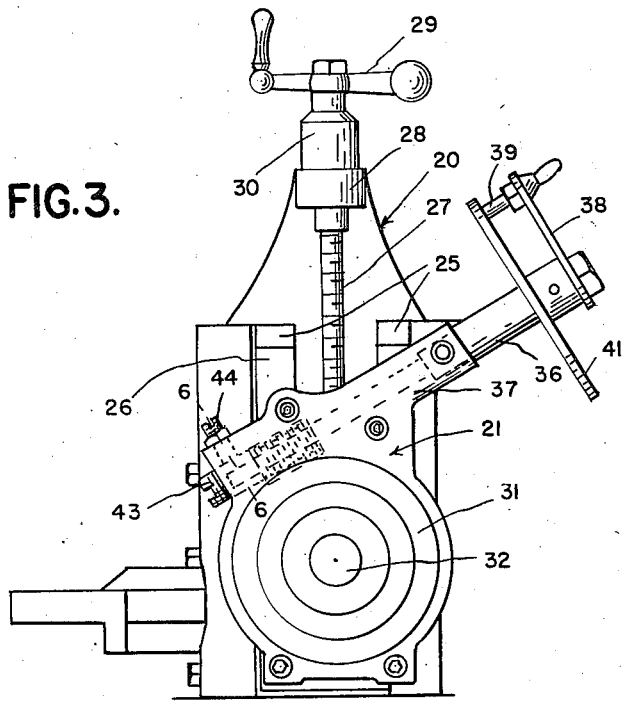
Figure 3 is a side elevational view of the attachment.
Figure 7:
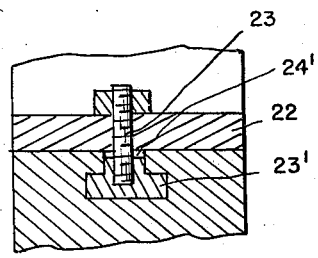
Figure 7 is a cross sectional view taken on the line 7—7 of Figure 5.
Figures 4, 5, 6:
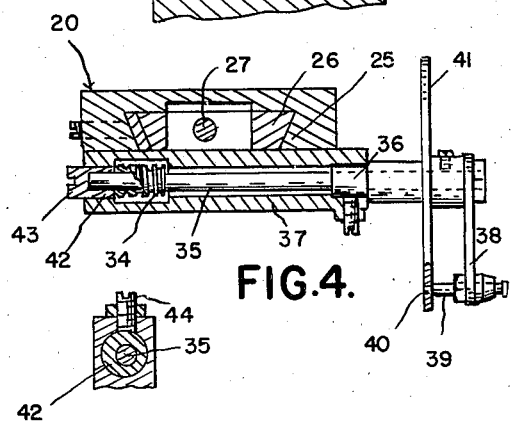
Figure 4 is a sectional view taken on the line 4—4 of Figure 2.
Figure 5 is a sectional view taken on the line 5—5 of Figure 2.
Figure 6 is a cross sectional view taken on the line 6—6 of Figure 3.

For the purpose of illustrating the present invention, I have shown my improved auxiliary tool as attachable to a conventional metal turning lathe. Briefly, the lathe comprises a bed 10 having head and tail stocks 11 and 12, respectively, supported thereon in the usual manner. The head stock 11 is provided with a tool supporting spindle 13 and the latter is driven at various speeds in accordance with the usual practice.

A carriage 14 is supported on the bed 10 of the lathe between the head stock 11 and tail stock 12 for sliding movement longitudinally of the bed 10. The carriage is guided throughout its sliding movement relative to the bed 10 by V and flat ways 15 and 16 respectively. Also the carriage 14 has a part 17 which is movable in opposite directions transversely of the longitudinal movement of the carriage in order to provide the desired cross feed, as well as the longitudinal feed. Both of these feeds may or may not be power operated insofar as the present invention is concerned.

The cross feed part 17 of the carriage 14 supports the usual compound 18. The compound 18 is slidably supported on a swivel 19 which, in turn, is carried by the part 17. This construction enables the compound to be located in any one of a plurality of positions with respect to the spindle 13.

The auxiliary tool forming the subject matter of this invention is attachable to the compound 18 for movement as a unit therewith. In detail, the auxiliary tool or attachment comprises a frame or a support 20 and a dividing head 21. The frame or support 20 is alternatively attachable in two different positions to the compound 18 and is provided with angularly spaced attaching flanges 22 and 22' for this purpose. The flanges are selectively clamped to the compound by a clamp 23' having a substantially inverted T-shaped cross sectional area corresponding to the inverted T-shaped recess or guide 24' formed in the compound 18. The arrangement is such as to enable the clamp to be readily slidably engaged in the recess or guide 24', when desired. Suitable bolts 23 are provided for securing the clamp to the compound 18 and for alternatively securing the flanges 22 and 22' to the clamp. Provision is also made herein for accurately positioning the clamp and, accordingly, the auxiliary attachment relative to the compound 18. This is accomplished by securing an end plate 21' to one end of the clamp 23' by an adjusting screw 25'. The opposite ends of the plate overlap the adjacent surface of the compound at one end of the recess or guide 24' so that manipulation of the screw 25' adjusts the auxiliary attachment relative to the compound.

The support 20 is also formed with a pair of laterally spaced vertically extending gibs 25 which cooperate with one another to guide a vertically movable slide 26. In the present instance, the slide 26 is vertically adjusted by a micrometer screw 27 supported for rotation between the gibs 25 by means of a bearing 28 formed integral with the upper end of the support 20. The lower end of the screw is threaded into the upper end of the slide 26 in such a manner that rotation of the screw in opposite directions raises and lowers the slide relative to the support 20. The screw is manipulated by means of a handle 29 secured to the upper end of the screw and having a calibrated head 30 which cooperates with a reference line on the bearing 28 to enable the slide to be adjusted predetermined increments in both directions relative to the support 20.

The dividing head 21 is secured to the slide 26 for movement as a unit with the latter and comprises a housing 31 having a central opening therethrough for rotatably supporting a spindle 32. In the illustrated embodiment of the invention, the spindle 32 is externally threaded to enable a suitable work holding member to be readily attached thereto. This work holding member is not shown herein but may be either in the form of a face plate or a chuck.

The spindle 32 is rotatably adjusted step by step through the medium of irreversible gearing supported in the housing 31. This gearing comprises a worm wheel 33 secured to the spindle 32 and adapted to mesh with a worm 34 which, in turn, is secured to a shaft 35. The shaft 35 is journaled in a bushing 36 which is clamped in an extension 37 of the housing 31. The upper end of the shaft 35 projects beyond the bushing 36 and is rotated by a manually operated crank 38 having a slidable plunger 39 at the outer end thereof adapted to successively engage in suitable openings 40 formed in an indexing disc 41 adjacent the periphery of the latter. The indexing disc is secured to the upper end of the bushing 36 against rotation with the shaft 35 and the openings 40 are spaced from each other circumferentially of the disc to enable the shaft 35 to be rotated predetermined increments in opposite directions. Inasmuch as the shaft 35 is connected to the spindle 32 through the medium of the worm gearing, it follows that the spindle is moved step by step at a reduced speed. This arrangement renders it possible to obtain precision adjustment of the spindle 32 about its axis and such action is, of course, desirable in performing certain operations.

In accordance with this invention provision is made herein for adjusting the position of the worm 34 relative to the worm wheel so as to compensate for any wear or manufacturing inaccuracies. In detail, the lower end of the shaft 35 is journaled in an eccentric 42 suitably rotatably supported in the housing 31 to enable movement of the worm in directions toward and away from the worm wheel. The eccentric is adjusted by means of a screw head 43 accessible for manipulation exteriorly of the housing and adapted to be locked in any one of its various adjusted positions by means of the lock screw 44.

Thus, from the foregoing it will be observed that I have provided a relatively simple, compact and inexpensive auxiliary tool capable of being readily attached to the compound of a conventional metal turning lathe. It will also be noted that my improved attachment is not only capable of all of the numerous adjustments provided by the compound but is also capable of vertical and rotative movements. In general, the auxiliary tool or attachment enables milling machine and dividing head operations to be performed on the work by merely using an orthodox lathe.

What I claim as my invention is:

1. An attachment for machine tools comprising a vertical support, a slide mounted on the support for vertical sliding movement in opposite directions relative to the support, a spindle rotatably mounted on the slide, means carried by the slide and operatively connected to the spindle for rotating the spindle throughout a plurality of increments of travel, and angularly spaced attaching flanges alternately attachable to a machine tool to locate the axis of the spindle in different angular positions with respect to the machine tool.

2. An attachment for machine tools comprising a vertical support, a slide mounted on the support for vertical sliding movement in opposite directions relative to the support, a housing fixed to the slide for movement with the latter, a rotatable spindle journaled in the housing with its axis of rotation extending substantially perpendicular to the plane of sliding movement of the slide, a worm wheel secured to the spindle within the housing, a worm also rotatably supported in the housing and meshing with the worm wheel, indexing means for rotating the spindle through the worm and worm wheel, and angularly spaced attaching flanges alternately attachable to a machine tool to locate the axis of the spindle in different angular positions with respect to the machine tool.

LOUIS G. HILL.